United States Patent
Kawabe et al.

[15] 3,684,329
[45] Aug. 15, 1972

[54] LOAD RESPONSIVE HYDRAULIC PRESSURE CONTROL MECHANISM OF AN AUTOMOTIVE VEHICLE

[72] Inventors: Tsuneo Kawabe; Hiroshi Takeshita, both of c/o Aisin Seiki Company Limited of No. 1, 2-chome, Asahi-machi, Kariya, Japan

[22] Filed: April 16, 1971

[21] Appl. No.: 134,835

Related U.S. Application Data

[63] Continuation of Ser. No. 843,428, July 22, 1969, abandoned.

[30] Foreign Application Priority Data

July 20, 1968 Japan ...................43/51449

[52] U.S. Cl. ..................303/22 R, 188/195, 303/6 C
[51] Int. Cl. ..............................B60t 8/18
[58] Field of Search ...303/22 A, 22 R, 6 C; 188/349, 188/195

[56] References Cited
UNITED STATES PATENTS 3,563,612   2/1971   Okamoto et al. ........303/22 R Primary Examiner—Milton Buchler
Assistant Examiner—John J. McLaughlin
Attorney—Sughrue, Rothwell, Mion, Zinn & Macpeak

[57] ABSTRACT

In a load responsive brake pressure control mechanism for an automotive hydraulic brake system comprising a cylinder, a differential hydraulic piston movably mounted therein, valve means adapted for on-off controlling the fluid communication between a first hydraulic chamber kept in permanent fluid communication with a master cylinder and a second hydraulic chamber kept in permanent fluid communication when a certain hydraulic pressure is applied onto said differential piston and a spring for urging said valve means towards its open position, the provision of spring means capable of modifying the spring force of said spring depending upon a variation in the distance between the vehicle chassis frame and the rear axle shaft.

7 Claims, 10 Drawing Figures

PATENTED AUG 15 1972

TO WHEEL BRAKE CYLINDER MEANS

FROM MASTER CYLINDER

FIG. 10
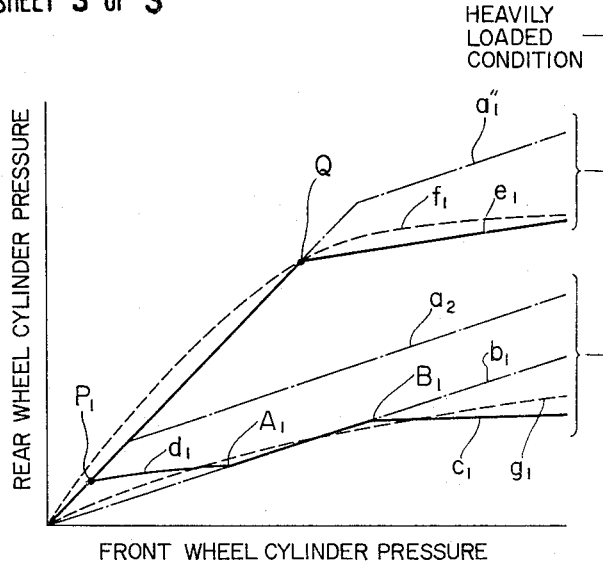
FIG. 7
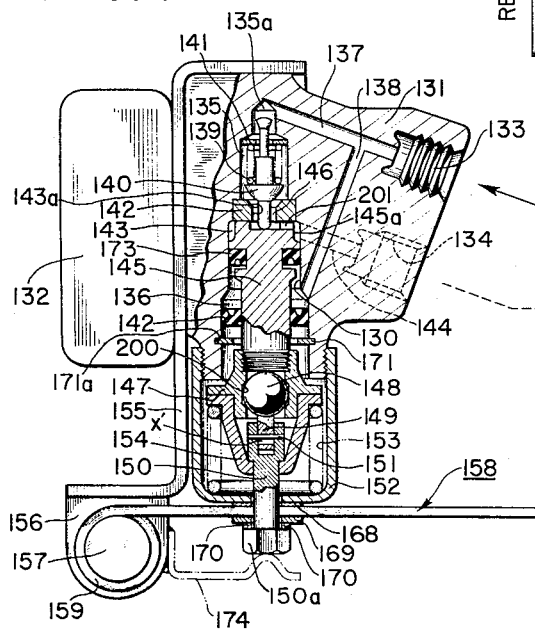
FIG. 9
FIG. 8

LOAD RESPONSIVE HYDRAULIC PRESSURE CONTROL MECHANISM OF AN AUTOMOTIVE VEHICLE

This application is a continuation of application Ser. No. 843,428 filed July 22, 1969, now abandoned.

This invention relates to improvements in and relating to load responsive hydraulic brake pressure control mechanism which is provided in the hydraulic circuit connecting a master cylinder with wheel cylinders and adapted for sensing variations in the distance between the chassis frame and the axle shaft of an automotive vehicle, depending upon the occasional loaded condition thereof so as to control the hydraulic pressure delivered from said master cylinder to the wheel cylinders and in function of load shift caused by braking.

It is the main object of the invention to provide a hydraulic brake pressure control mechanism of the above kind which is capable of providing an optimum brake force distributing ratio between the vehicle rear wheels and the front wheels during braking under no or substantially no line load condition and in an approximation to an ideal brake force distribution as close as possible.

The above and further objects, features and advantages of the invention will become more clear from the following detailed description of the invention by reference to three preferred embodiments of the invention shown in the accompanying drawings, in which.

FIGS. 7 and 8 constitute in combination a unified drawing which is a schematic arrangement view, partially sectioned, of a third embodiment of the invention.

FIG. 9 is an enlarged sectional view of a part of the arrangement shown in FIG. 7, yet showing a modification therefrom.

Figure 5:
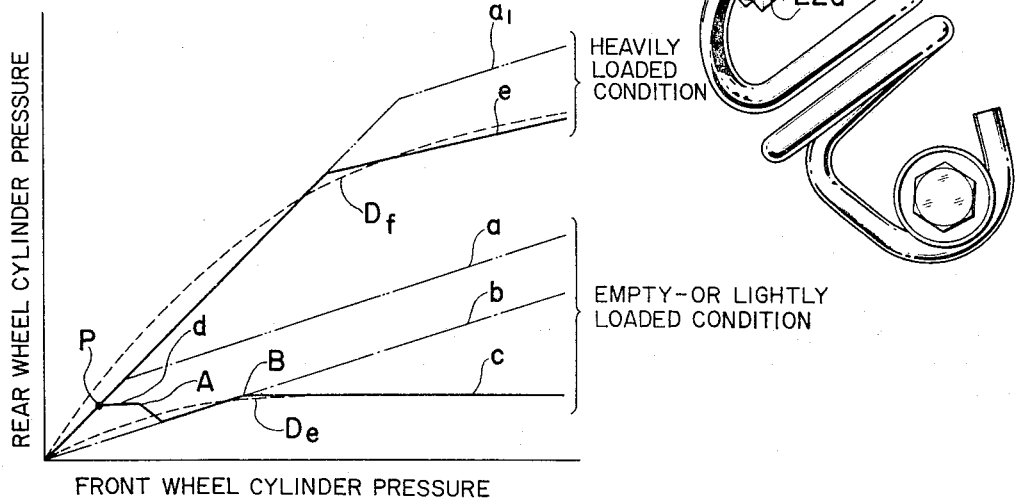
FIGS. 5 and 6 are two characteristic performance curves of the first and second embodiments, respectively.

FIG. 10 is a similar view to FIG. 5, showing a characteristic performance curve of the third embodiment.

In the following, several preferred embodiments of the invention will be described by reference to the accompanying drawings which constitute a part of this specification.

Figure 1:
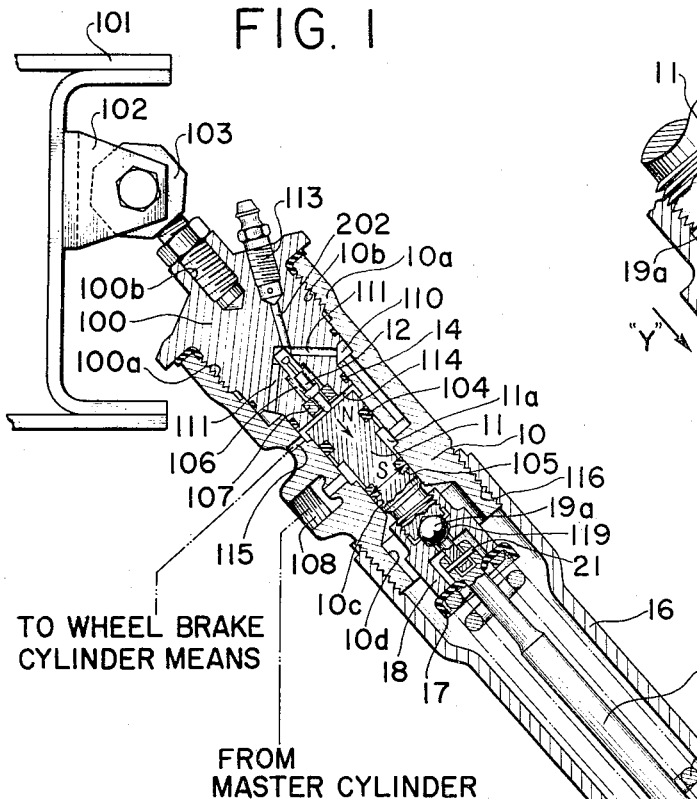
FIG. 1 is substantially a longitudinal sectional view of a first embodiment of the brake pressure control mechanism constructed in accordance with the invention.
Figure 2:
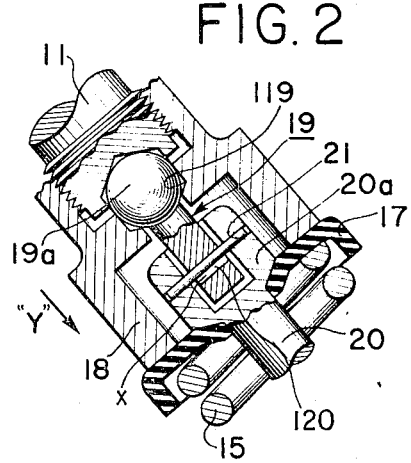
FIG. 2 is a part thereof shown in an enlarged scale.

In the first embodiment shown in FIGS. 1 and 2, a hollow cylinder 10 is formed with an enlarged upper open end 10a provided with female threads 10b. A plug piece 100 is threadedly coupled with said upper cylinder end 10a. For this purpose, the plug 100 is formed with male threads 100a for engagement with mating threads 10b. The numeral 101 represents the conventional chassis frame, only partially shown, of an automotive vehicle, not shown, and a rigid support member 102 is fixedly attached to said frame for suspending hingedly the plug and cylinder assembly 10, 100 through the agency of a threaded suspension member 103 which is kept in threaded engagement with a female threaded suspension bore 100b.

A multiple-stepped piston 11 provided with sealing rings 104 and 105 is slidably received in the stepped bore 10c of the cylinder 10. The plug piece 100 is formed with an axial valve chamber 106 which is fitted with a valve seat member 107 fixed in position, for instance, by press fitting. A valve member 12 is slidably received in the valve chamber 106 and so arranged that it is on-off controlled by the piston 11. There is formed on the piston 11 a shoulder 11a defined between the uppermost and the largest head of the piston and the intermediate reduced part thereof, the latter part being partially encircled by an oil chamber 13 which is formed into a ring space defined between the piston and the cylinder, said oil chamber kept in permanent fluid communication with a conventional master cylinder, not shown, commonly used in the automotive brake system, through a connecting passage 108 and a piping 109 shown only schematically by a chain-dotted line. Oil chamber 13 is fluidically connected through a duct 14 formed in the wall of the cylinder 10 with a ring space 110 defined by the plug 100 and the bottom of the upper enlarged part 10a of the cylinder 10, said ring space being kept in turn in fluid communication with valve chamber 106 through a plurality of communicating passages 111. The upper part of valve chamber 106 is kept in communication with an air discharge passage 202 which is plugged normally tightly by a bleeding threaded member 113. Accumulated air, if any, can be bled from the upper part of valve chamber 106 by loosening slightly the bleeding member 113, as conventionally. A piston chamber 114 is formed between the lower end of said plug piece 100 and the head of said piston 11, said piston chamber being kept in fluid communication with oil chamber 13, and thus with the master cylinder, when the valve member 12 is brought into its open position as shown. The piston chamber is connected with a communication passage 115 and a communication piping, not shown, with conventional rear wheel brake cylinder means, not shown, of the automotive vehicle.

At the lower end of said cylinder 10, a sleeve 16 is threadedly connected at 116. The lower end of said piston 11 extends into the lower enlarged part 10d of the bore 10c and threadedly connected with a retainer piston member 18 which carries a spring guide 17 shaped into a circular dish for receiving the upper end of a compression spring 15. In proximity of the lower end of sleeve 16, the latter is formed in its inside wall surface with a peripheral ring groove 117 which receives a snap ring 118 acting as a stop for receiving the opposite or lower end of said compression spring 15. By the provision of this compression spring 15, the combined piston 11, 18 is urged to move in the axially upward direction for opening said valve member 12 as shown.

Retainer piston 18 is formed with a retaining recess 119 which receives rotatably the ball end 19a of a connecting pin 19 which is connected with an adjustable rod 20 by means of a lateral pin 21 press fit to the upper forked end 20a formed on said rod 20.

The forked rod end 20a is supported in practice by the spring guide 17 which is fixedly attached to the lower end of the retainer piston 18, for instance, by welding, riveting or the like conventional fixing means, although not shown. The lateral pin 21 passes with considerable plays through a lateral opening 120. As most clearly seen from FIG. 2, there is a certain clearance $x$ between the upper inside wall of the opening 120 and the peripheral surface of the pin 21 under normal operating conditions of the mechanism the purpose of which will be described more in detail hereinafter.

The lower end of rod 20 protrudes from inside of the sleeve 16 and is threadedly connected with a screw adjuster member 22, the lower end of which is formed into a hook 22a. Between the hook and a conventional automotive axle shaft, only shown representatively by a hanger bolt 121 fixedly attached to the latter, there is tension spring 23. For the prevention of foreign particles from invading into the inside space of sleeve 16, a dust cover 122 is provided, the both ends of which are fixedly attached to the lower end of said sleeve and an intermediate point of said rod 20 in proximity to its lower end.

The screw adjuster 22 serves for intentionally modifying the pretension of spring 15 in accordance with occasional variation in the stationary distance between chassis frame 101 and the automotive axle shaft which distance is subjected naturally to modification depending upon the loaded conditions of the automotive vehicle, or more specifically the chassis frame thereof.

The operation of the load responsive braking mechanism so far shown and described is as follows.

It is now assumed that the loaded conditions of the vehicle are those of accurately or nearly non-live load. Under these conditions, when the driver depresses a conventional foot brake pedal, not shown, so as to increase the master cylinder pressure which is then conveyed through piping 109 and connecting passage 108 to oil chamber 13, thence through connecting duct 14, ring space 110, communicating passages 111 and opened valve chamber 106 into piston chamber 114, thus acting upon the top and largest working surface of piston 11 for urging it to move downwards. On the other hand, substantially same oil pressure will act in the reverse or upward direction upon the piston shoulder 11a of the same piston for urging it to move upwards. Therefore, the true effective hydraulic oil pressure will act upon a differential piston surface denoted at S in FIG. 1.

When the above-mentioned differential hydraulic pressure acting in practice upon the combined piston 11, 18 exceeds that corresponding to the spring force at 15, which is adjustable by the occasional spring tension at 23 and the wheel cylinder pressure attains at a certain critical point such as at P shown in FIG. 5, the combined piston will be urged to move axially downwards by the hydraulic pressure against the return action exerted by the spring 15, valve member 12 is brought into its closing position by contact with valve seat member 107, thus the hydraulic communication between the master cylinder and the wheel brake cylinder(s) being interrupted. The downwardly moving direction of said combined piston is shown by an arrow N in FIG. 1. Whereupon when the master cylinder pressure is increased by further continued depression of the foot brake pedal, the correspondingly increased effective hydraulic differential pressure acting upon the combined piston and the spring action at 15 and 23 which is variable with deceleration effect of the vehicle wheels, the piston will be moved in the direction of the arrow N or in the reverse direction, thus the valve member 12 being subjected to on-off control action.

When the vehicle deceleration effect becomes still large under these working conditions, the spring force at 15 will be balanced out by the tension spring force at 23. From this time point, the lateral pin 21, together with the adjustable rod 20, will initiate to move the clearance distance $x$ in FIG. 2 and in the direction of an arrow Y. During this travel period, the valve member 12 will perform on-off control action without being influenced in any way by the spring forces at 15 and 23. With occasional increase of the distance between the chassis and the axle shaft, the combined piston will be subjected to a pull by the spring force at 23 through adjusting rod 20, lateral pin 21, ball pin 19 and retainer piston part 18, so as to completely close the valve member 12. Thus, a further increase of the rear wheel cylinder pressure will be interrupted.

More specifically, when no or substantially no live load is on the vehicle and the vehicle is under its running conditions, the distance between the chassis and the axle shaft will be subjected to modification in case of braking and by the load transfer caused by the latter, thereby resulting in an alteration of the tensile spring force at 23 and thus in the same at 15. When now assuming that $F_a$ denotes the spring force at 15 acting upon the combined piston and $F_b$ represents the force whereby the compression spring is compressed under the influence of tension spring 23. Then, we will obtain:

$$F = F_a - F_b \quad (1)$$

$$F_a > F_b \quad (2)$$

where, $F$ denotes the effective or resultant spring force acting upon the piston. Formula $(=-=$ When the deceleration of the vehicle is increased and the distance between chassis and axle shaft is thus further increased, then the above formula (1) will be:

$$F = F_a - F_b = 0 \quad (3)$$

Upon the acting force F upon the combined piston is reduced at a certain point A on the line $a$ to nil, the wheel cylinder pressure will vary along the line $b$, whereupon the piston will be subjected to oscillative movement exclusively under the influence of the effective hydraulic differential pressure in the aforementioned meaning. With further increase of the distance between chassis and axle shaft, the tensile spring force at 23 will overcome that of 15, the combined piston will be pulled through ball pin 19, lateral pin 21 and adjusting rod 20 by the tension spring 23, thereby the valve member 12 being brought into its closing position for the effective interruption of the hydraulic communication between the master cylinder and rear wheel cylinder means. This point is shown by way of example at B in FIG. 5. After attainment of this point, the possible variation will be carried into effect along the line $c$ in FIG. 5.

Under heavily loaded conditions of the vehicle, the distance between chassis and rear axle shaft will be correspondingly reduced.

In this case also, the force $F$ acting upon the combined piston will be defined by the same Formulas (1) and (2). The operational curve in this case will be as that shown at $e$ in FIG. 5, by way of example. Curves $a$ and $a_1$ represent design performance curves to be applied to the both loaded conditions above mentioned.

Figure 3:
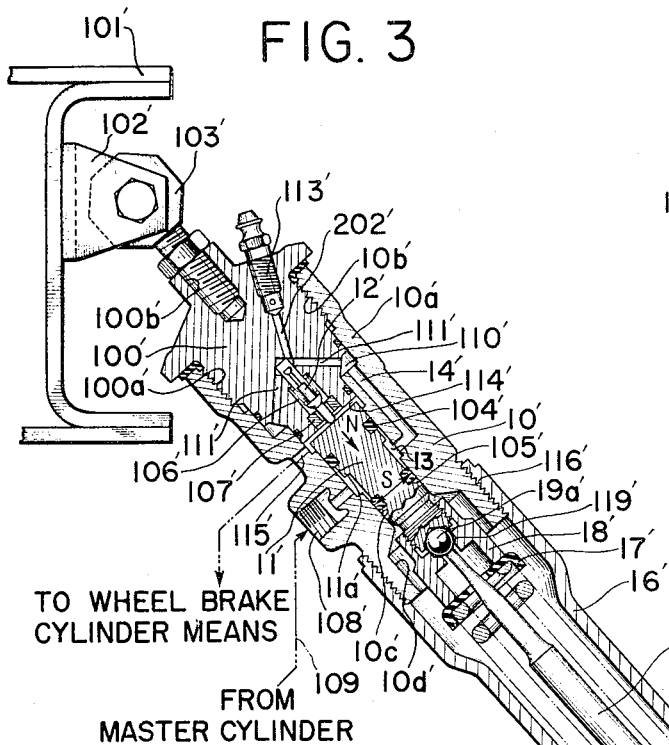
FIG. 3 is a similar view to FIG. 1, yet showing a second embodiment of the invention.
Figure 4:
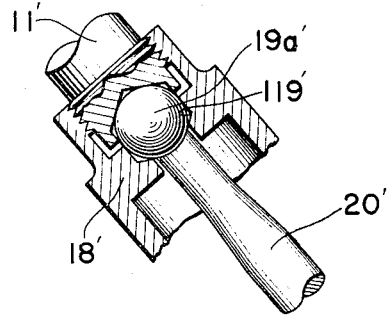
FIG. 4 is a similar view to FIG. 2, yet showing a part of FIG. 3.

Next, referring to FIGS. 3 and 4, the second embodiment will be described in detail.

In this embodiment, same reference numerals attached each with a prime are employed as those used in the foregoing embodiment shown in FIGS. 1 and 2, for better understanding of the invention for quicker identification of the same or similar constituents in the both embodiments.

In the present embodiment, the ball 19' is formed on the upper end of adjusting rod 20' in place of the separated arrangement of ball pin 19 and adjusting rod 20 in the foregoing embodiment. This constructional modification shown more specifically in FIG. 4 is the only difference of the present embodiment from the foregoing.

The operation of the second embodiment is as follows.

It is again assumed that the loaded conditions of the vehicle are those of accurately or nearly non-live load. Under these conditions, when the driver depresses a conventional foot brake pedal, so as to increase the master cylinder pressure which is then conveyed through piping 109' and connecting passage 108' to oil chamber 13', thence through connecting duct 14', ring space 110' communicating passages 111' and opened valve chamber 106' into piston chamber 114', thus acting upon the top and largest working surface of piston 11' for urging it to move downwards. On the other hand, substantially same oil pressure will act in the reverse or upward direction upon the piston shoulder 11a' of the same piston for urging it to move upwards.

Figure 6:
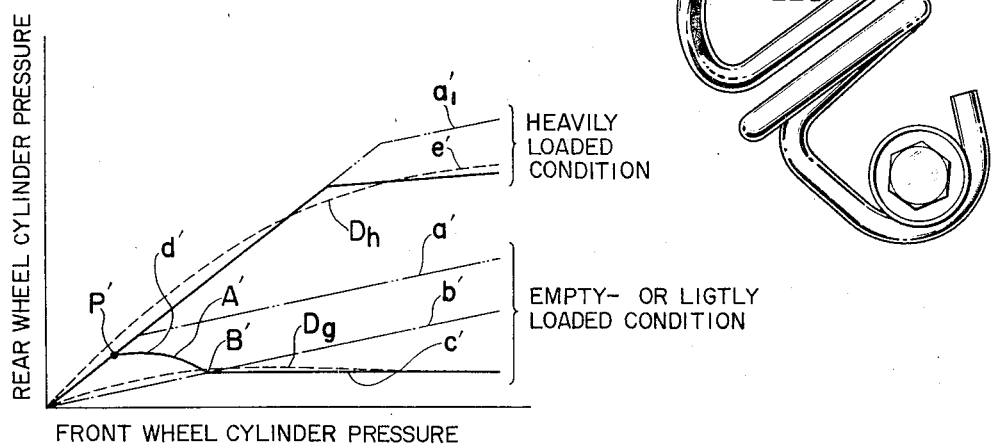

When the differential hydraulic pressure acting in practice upon the combined piston 11', 18' exceeds that corresponding to the spring force at 15', which is adjustably by the occasional spring tension at 23' and the wheel cylinder pressure attain at a certain critical point such as at P' shown in FIG. 6, the combined piston will be urged to move axially downwards by the hydraulic pressure against the return action exerted by the spring 15', valve member 12' is brought into its closing position by contact with valve seat member 107', thus the hydraulic communication between the master cylinder and the sheel brake cylinder(s) being interrupted. The downwardly moving direction of said combined piston is shown by an arrow N' in FIG. 3. Whereupon when the master cylinder pressure is increased by further continued depression of the foot brake pedal, the correspondingly increased effective hydraulic differential pressure acting upon the combined piston and the spring action at 15' and 23' which is variable with deceleration effect of the vehicle wheels, the piston will be moved in the direction of the arrow N' or in the reverse direction, thus the valve member 12' being subjected to on-off control action, so as to increase the wheel cylinder pressure along the line d' in FIG. 6 as an example.

Then the vehicle deceleration effect becomes still larger under these working conditions, resulting in an increase of load shift from the rear to the front vehicle wheels and in the corresponding increase of the distance between chassis and rear axle shaft, the compressing force exerted by tension spring 23' upon compression spring 15' which may be expressed by $F_b'$ similar to the foregoing value $F_b$ will become nearly the urging force exerted by said compression spring 15' upon combined piston 11', 15' which may be denoted $F_a'$ in the similar way as in the foregoing, and the rear wheel cylinder pressure will decrease considerably relative to the front wheel cylinder pressure, as shown by the line $d'$ by way of example in FIG. 6.

With further increase of the distance between chassis and axle shaft, the spring force at 23' will overcome that of the compression spring 15', and thus the combined piston will be subjected to a pull exerted by tension spring 23' through the agency of adjusting rod 20'. In this way, valve 12' and the fluid communication between master cylinder and rear wheel cylinders is positively interrupted. This operational point is shown at B' in FIG. 6.

Thereafter, the wheel cylinder pressure is controlled as shown by the line $c'$ in FIG. 6.

When the vehicle is under heavily loaded conditions, the distance between chassis and axle shaft is naturally reduced in comparison with the foregoing substantially dead-weight loaded conditions, and said force $F_a'$ is always larger than $F_b'$. The performance curve under these conditions is shown at $e'$ in FIG. 6 by way of example.

In FIGS. 5 and 6, dotted line curves $D_e$, $D_f$, $D_g$, and $D_h$ denote design optimum operation curves which are commonly known among those skilled in the art.

Finally referring to FIGS. 7–10 the third 10, of the invention will be described in detail in the following.

In FIGS. 7–8, the numeral 131 denotes a cylinder member which is fixedly attached to the chassis frame 132 of the vehicle, said frame being shown schematically only by a small part thereof and the fixing means commonly used for this purpose have been omitted from the drawing on account of its very popularity.

The cylinder member 131 is formed with an inlet opening 133 which is hydraulically connected with a conventional master cylinder as before. The cylinder 131 is formed further with an outlet opening 134 which is hydraulically connected with rear wheel cylinder means, not shown. The cylinder 131 is provided with a stepped bore which is open at the lower end and comprises a reduced bore part 135, an intermediate bore part 130 and a largest bore part 136. The reduced bore part 135 constitutes a valve chamber which is kept in fluid communication with said inlet opening 133 through connecting passage 137, and the latter bore part 136 is also fluidically connected through connecting passage with said inlet opening. In the valve chamber 135, there is a valve member 140 which is resiliently urged to move downwards by a compression spring 139 which abuts at its one end against a retainer 141 formed into a snap spring 171 fixedly, yet detachably mounted on the inside wall surface of an extension chamber 135a of said reduced bore part 135.

A closure cup 152 is threadedly attached to the lower open end of said cylinder member 131. A valve seat member 142 adapted for cooperation with said valve member 140 is fixedly positioned by pressure fit or the like conventional fixing means within said stepped bore at its intermediate portion defined by the valve chamber 135 and the intermediate bore part 130.

A piston 145 provided sealing means 173 is slidably mounted in the intermediate bore part 130 and extends into the interior space of the lowermost or largest bore part 136. Retainer piston element 147 is threadedly attached to the main piston 145 and provided with a retaining recess 200 which holds rotatably the ball end 148 of ball pin 149 in position. The main piston 145 is formed at its top end with a peripheral recess 145a so as to provide a ring chamber 143 which fluidically communicates through a communicating passages 144 with said outlet opening 134, on the one hand, and with the valve chamber 135 through radial groove means 146 formed on top of the main piston and the bore 143a drilled axially through the valve seat member 142 when the valve member 140 is receded from contact with the latter, on the other hand. The upper end of the ball end 148 is permanently kept in contact with the lower end surface of said main piston.

Adjusting rod 150 is linked at 151 with the ball pin 149. A cup-shaped spring guide 154 is bridged between retainer piston 147 and adjusting rod 150 and receives under pressure one end of compression spring 153, while the opposite end of the latter abuts against the bottom wall of said closure cup 152.

A rigid member 155 fixedly attached to said chassis frame 132 is provided with a wing 156, an elongated strip spring 158 being pivotably mounted at its root end 159 on the wing by means of a pivot pin 157. The opposite end 160 of said strip spring is pivotably mounted through an elastic ring 161 and a hinge pin 162. Connecting rod 164 is fixedly attached by its upper end with connecting member 163, on the one hand, and pivotably connected with rear axle shaft 167 through resilient ring 165 and a pivot pin 166 as shown. Washer plates 168 and 169 are attached to the strip spring 158 in a sandwiching manner, and a spring washer 170 is attached from below to the latter washer 169, as shown.

The adjusting rod 150 passes through respective bolt holes formed in the overlapping members 168, 158, and 169 with enough plays for allowing the rod to move axially thereof, said rod having at its lowermost end shaped into a hexagonal head 150a, so as to prevent the members 169 and 170 from dropping off. A pressure strip spring 174 is attached fixedly at its root end to said wing 156, the free end of said strip spring being kept in pressure contact with said rod head 150a for intensifying said effect. Below the lateral pin, there is provided an idle gap $x'$ which is similar in its shape and in its function to that shown $x$ in FIG. 2.

There is provided a sealing ring 172 in the largest bore part 136 so as to seal off the main piston 145 at its intermediate point in proximity to the lower piston end for dividing sealingly said stepped bore into an upper hydraulic piston chamber and a lower air chamber. At an intermediate point within the largest bore part 136, there is provided an inside peripheral groove 17a which receives a snap spring 171 acting as a stop adapted for preventing said sealing ring 172 from slipping off. The provision of said strip spring 174 serves for altering the spring constant at 153 from outside of the whole mechanism and without modifying the compression 153 per se.

The operation of the third embodiment shown in FIGS. 7 and 8 which constitutes a unitary drawing by overlapping section lines W—W' in these figures together, is substantially same as that of the first embodiment. For better understanding of the invention, the operation will be described only briefly in the following.

By virtue of the provision of the gap $x'$ similar to that denoted $x$ in the first embodiment, the operational performance curves are similar to those shown in FIG. 5, as shown clearly in FIG. 10. In the present embodiment, the strip spring 158 will act in the same way as that of tension spring 23. With variation of the distance between chassis frame and rear axle shaft either in the negative or positive sense, as the case may be, the free end 160 of strip spring 153 will be flexed upwards or downwards, as shown at 160a or 160b which influences upon the resilient compressive force at 153 and thus the operating mode of the piston assembly 145, 147. As for the performance curves shown in FIG. 10, $P_1$, $d_1$, $A_1$, $B_1$, $c_1$, $g_1$, $a_2$, $b_1f_1$, $e_1$, and $a_1''$ correspond to P, d, A, B, c, $D_e$, a, b, $D_f$, e and $a_1$, respectively.

In FIG. 9, a slightly modified design from the third embodiment is shown. In this case, the ball pin 119 and the adjusting rod 150 employed in the foregoing third embodiment is combined into one piece. The resulted ball end is shown at 148' and the rod proper is illustrated at 150'. The retainer piston 147 and the spring guide 154 employed in the third embodiment are united together into one piece shown at 147'. A corresponding compression spring 153' is also shown which is completely similar to that shown at 153 in FIG. 7. In the similar manner to the arrangement shown in FIGS. 3 and 4, or FIG. 7 the normal gap $x$ or $x'$ is dispensed with. It will be therefore easily understood from the foregoing that the operational performance curves obtainable with use of this modified design will be substantially same as those shown in FIG. 6. the As will be easily supposed from the foregoing detailed description by reference to several preferred embodiments of the invention, the use of the load responsive brake pressure control mechanism embodying the novel principles proposed by the invention will provide the following advantage that when the amount of variation in the distance between chassis frame and axle shaft, being caused by load shift during brake operation in the empty or lightly loaded conditions, or alternatively heavily loaded conditions, of an automotive vehicle which is fitted with the present brake pressure control mechanism mounts to a predetermined value, a tension spring provided within the mechanism is forced to act upon a hydraulic piston movably mounted in a hydraulic cylinder, for pulling the piston from its normal position, so as to perfectly close a valve means normally kept open, whereby a further increase of the hydraulic rear wheel cylinder pressure is effectively prevented. In this way, the brake force distribution among the rear wheels and the front wheels of the vehicle may be brought optimumly into substantial coincidence with the design ideal performance curve, regardless of the loaded or unloaded conditions of the vehicle and during every braking period. It will be seems further from the foregoing that this effect is more effective under non-loaded or lightly loaded conditions of the automotive vehicle. The brake pressure control mechanism pressure control mechanism proposed by the present invention has been found that it is highly effective when fitted to trucks, busses and the like heavy duty vehicles for substantially improving the steering characteristics of the vehicle.

The provision of pin clearance such as at $x$ or $x'$ will provide especially the following advantage. It is commonly known that in case of the cab-over type automotive vehicles the upward shift of the center of gravity is considerable with heavy loading of the vehicle. Especially, in this case, as seen in the right-hand region from apex Q and along the line $e_1$, the slope of the ideal line $f_1$ is smaller than that of the ideal line $g_1$. In this region, the increasing rate of rear wheel cylinder pressure relative to higher front wheel cylinder pressure is less for empty or lightly loaded state of the vehicle than that in the case of heavily loaded state thereof. According to our practical experiments, it has been found that the real characteristic performance curve comes nearer to the ideal curve when the above clearance $x$ or $x'$ is provided as in the case of the first or third embodiment than in the cases where no such clearance is given, as in the remaining embodiments.

We claim:

1. A load responsive brake pressure control device for a vehicle equipped with hydraulic brakes and adapted to vary the braking forces acting on the vehicle wheel depending upon vehicle load, said device comprising:
    a cylinder secured to one of two vehicle masses, one of which is sprung and the other unsprung,
    a differential hydraulic piston movable within said cylinder, and defining two oppositely acting chambers fluid coupled respectively to the master cylinder and the braking circuit for at least one vehicle wheel,
    a normally open valve operatively coupled to said piston for movement to an open position in response to the application of hydraulic fluid to said chambers with said valve controlling intercommunication between said two chambers, and
    spring means operatively connected between said piston and said other vehicle mass for normally urging said valve to the open position, said spring means being connected to said piston by a lost motion connection and being preset such that under vehicle empty or lightly loaded conditions said piston may be shifted by application of said applied hydraulic pressure to said piston from said master cylinder and/or by mechanical force exerted by said vehicle masses on said spring means to move said piston into completely open, partially open and closed valve positions by application of said hydraulic pressure acting on said differential hydraulic piston, without further action of said spring means, with intercommunication between said chambers being cut off in said closed position.

2. A load responsive brake pressure control device as claimed in claim 1 wherein said vehicle masses comprise the chassis and rear axle, respectively.

3. A load responsive brake pressure control device as claimed in claim 1, wherein said spring means comprises an elongated strip spring having one end thereof rotatably connected to said cylinder and the other end rotatably connected to a portion of said other vehicle mass positioned at a level lower than said spring, and means for maintaining an intermediate point of said spring, when positioned in its neutral position, at a predetermined clearance from said piston, and for operatively connecting said spring to said piston.

4. A load responsive brake pressure control device as claimed in claim 3 wherein said portion of said other vehicle mass is an axle shaft housing.

5. A load responsive brake pressure control device as claimed in claim 3 wherein said maintaining and connecting means comprises rod means coupled at one end to said spring and having a ball and socket connection at the other end thereof coupled to said piston.

6. A load responsive brake pressure control device as claimed in claim 5 wherein said rod means comprises a pair of rods, one of said rods having said ball and socket connection and the other of said rods being coupled to said spring, and means for connecting said rods in a manner to allow limited mechanical play therebetween.

7. A load responsive brake pressure control device as claimed in claim 3, wherein said spring means further comprise a compression spring, one end thereof being kept in engagement with a closure cup mounted on said cylinder and the other end thereof being kept in engagement with a spring guide having a substantially U-shaped cross-section, said guide being connected to said piston.

* * * * *

UNITED STATES PATENT OFFICE
CERTIFICATE OF CORRECTION

Patent No. 3,684,329           Dated     August 15, 1972

Inventor(s) Tsuneo Kawabe et al

It is certified that error appears in the above-identified patent and that said Letters Patent are hereby corrected as shown below:

In The Heading:

The name of the Assignee was omitted. Should read:

--Assignee: Aisin Seiki Co., Ltd., Aichi-ken, Japan--

Signed and sealed this 13th day of February 1973.

(SEAL)
Attest:

EDWARD M. FLETCHER, JR.                ROBERT GOTTSCHALK
Attesting Officer                      Commissioner of Patents